United States Patent [19]
Neil

[11] Patent Number: 6,004,503
[45] Date of Patent: Dec. 21, 1999

[54] METHOD OF MAKING A CERAMIC ARC TUBE FOR METAL HALIDE LAMPS

[75] Inventor: Jeffrey T. Neil, North Reading, Mass.

[73] Assignee: Osram Sylvania Inc., Danvers, Mass.

[21] Appl. No.: 09/165,847

[22] Filed: Oct. 2, 1998

[51] Int. Cl.⁶ .................................................. C04B 37/00
[52] U.S. Cl. .......................... 264/632; 264/614; 264/642; 264/654; 264/657; 264/666; 313/624; 313/625; 445/22; 445/26
[58] Field of Search ................ 445/22, 26; 264/632, 264/666, 654, 656, 657, 614, 642; 313/624, 625

[56] References Cited

U.S. PATENT DOCUMENTS

| | | | |
|---|---|---|---|
| 3,564,328 | 2/1971 | Bagley | 313/624 |
| 4,475,061 | 10/1984 | Van de Weijer | 313/625 |
| 4,545,799 | 10/1985 | Rhodes et al. | 313/623 |
| 4,766,347 | 8/1988 | Janssen | 313/625 |
| 4,999,145 | 3/1991 | Thibodeau | 264/632 |
| 5,424,609 | 6/1995 | Geven | 313/625 |
| 5,426,343 | 6/1995 | Rhodes | 313/623 |
| 5,682,082 | 10/1997 | Wei | 313/636 |
| 5,725,827 | 3/1998 | Rhodes | 264/632 |

*Primary Examiner*—James Derrington
*Attorney, Agent, or Firm*—William H. McNeill

[57] ABSTRACT

A method of making a ceramic arc tube for a metal halide lamp comprises the steps of forming as an integral unit a hollow body having one open end and a substantially closed end. The substantially closed end includes an outwardly extending capillary tube having an electrode receiving aperture therein that communicates with the hollow body. An end cap is then formed for closing the open end. The end cap comprises an annular portion and an extending capillary tube, The end cap is fitted into the open end of the hollow body to form a pre-assembly. The pre-assembly is then fired to seal the end cap to the hollow body to form an assembly and the assembly is subsequently fired to sinter the same.

5 Claims, 2 Drawing Sheets

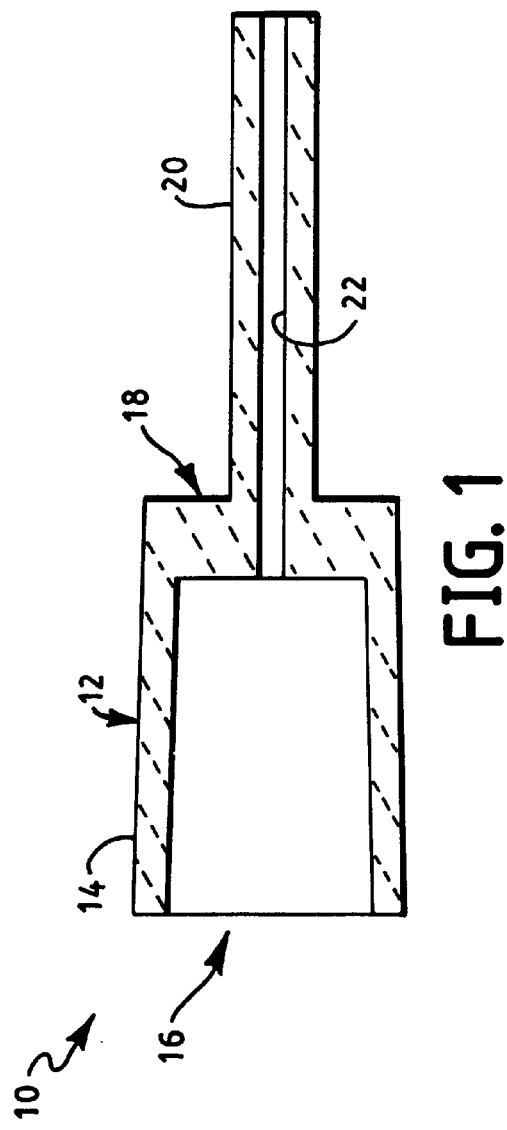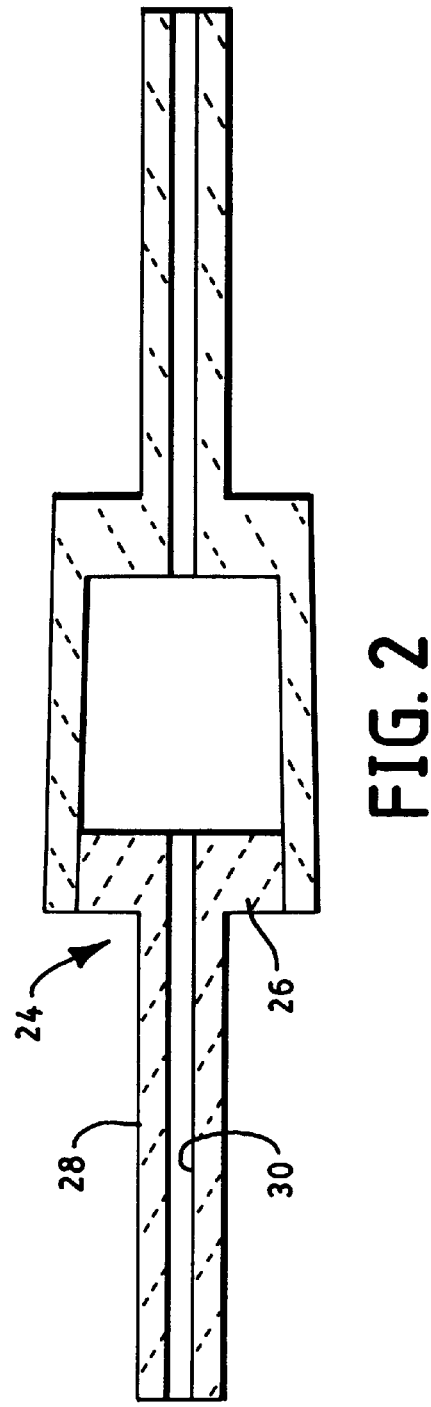

METHOD OF MAKING A CERAMIC ARC TUBE FOR METAL HALIDE LAMPS

TECHNICAL FIELD

This invention relates to a method of making ceramic arc tubes and more particularly to a method of making such arc tubes for use as metal halide lamps.

BACKGROUND ART

Ceramic arc tubes of materials such as polycrystalline alumina with one or more additives to control grain size have been used as the discharge vessel or arc tube for high-pressure sodium lamps. Recently, such arc tubes have been employed with metal halide lamps. See, for example, U.S. Pat. No. 5,424,609. Such arc tubes have comprised 5 piece structures including a cylindrical body, a pair of end closures or buttons, and a pair of electrode receiving rods or capillary tubes sealed to the buttons. Manufacture of such arc tubes required extrusion or pressing of the components, as well as multiple assembly and heat treatment steps that increased handling and, therefore, cost.

Additionally, three piece structures have been proposed. In U.S. Pat. No. 4,766,347 there is shown an arc tube having only a ceramic body with electrode receiving rods sealed directly therein. U.S. Pat. No. 5,426,343 discloses a three-piece structure wherein a sealing button has an extending electrode rod receiving member integral therewith.

All of these approaches require extra heating and handling steps.

DISCLOSURE OF INVENTION

It is, therefore, an object of this invention to obviate the disadvantages of the prior art.

It is another object of the invention to enhance the production of arc tubes.

These objects are accomplished, in one aspect of the invention, by a method of making a ceramic arc tube for a metal halide lamp which comprises the steps of forming as an integral unit a hollow body having one open end and a substantially closed end. The substantially closed end includes an outwardly extending capillary tube having an electrode-receiving aperture therein that communicates with the hollow body. An end cap is then formed for closing the open end. The end cap comprises an annular portion and an extending capillary tube. The end cap is fitted into the open end of the hollow body to form a pre-assembly. The pre-assembly is then fired to seal the end cap to the hollow body to form an assembly and the assembly is subsequently fired to sinter the same. Firing is generally continued until the body reaches a state of high translucency.

This procedure reduces the handling and, thus, the cost of making ceramic arc tubes.

BRIEF DESCRIPTION OF THE DRAWINGS

FIG. 1 is an elevational sectional view of a first element of the arc tube of the invention;

FIG. 2 is an elevational, sectional view of an assembled arc tube; and

BEST MODE FOR CARRYING OUT THE INVENTION

Figure 3:
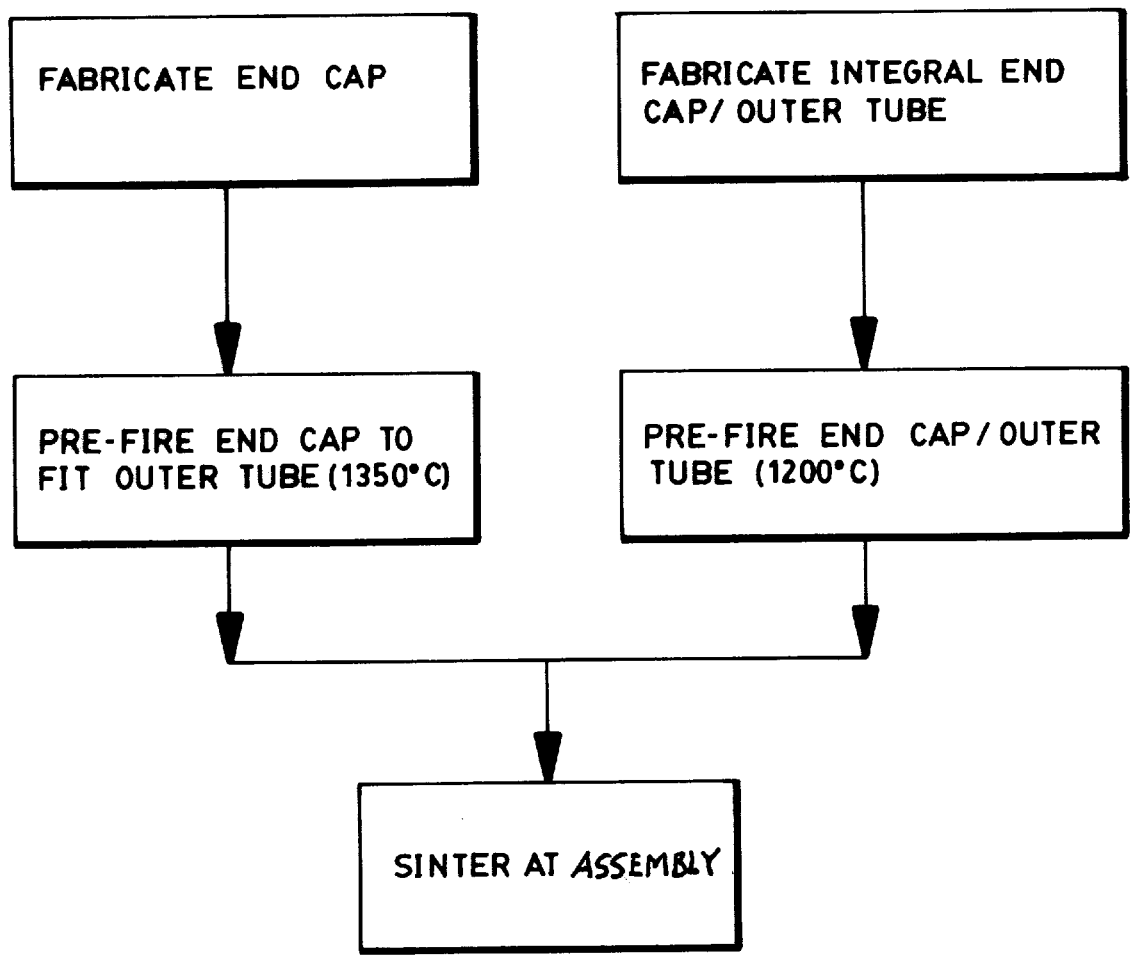
FIG. 3 is a flow diagram of the steps of the invention.

For a better understanding of the present invention, together with other and further objects, advantages and capabilities thereof, reference is made to the following disclosure and appended claims taken in conjunction with the above-described drawings.

Referring now to the drawings with greater particularity, there is shown in FIG. 1 an arc tube body 10 comprised of a first element 12 having a hollow body 14 with an open end 16 and a substantially closed end 18. The end 18 includes an outwardly extending capillary tube 20 having an aperture 22 therethrough.

An end cap 24 (see FIG. 2) comprises an annular portion 26 and an outwardly extending capillary tube 28 with an aperture 30 therethrough.

The hollow body 14 and end cap 24 are preferably formed from polycrystalline alumina containing minor amounts of magnesia, yttria and zirconia Such a material is shown in U.S. Pat. No. 5,682,082. Other minor constituents can also be included, as is known in the art. In a preferred embodiment of the invention body 14 and end cap 24 are made by injection molding or gel casting and utilize Baikowski grade CR-6 alumina powder containing 0.05 weight percent magnesia.

After initial fabrication, the hollow body 14 is heated to remove binder material and impart handling strength. Such heating is at 1200° C. for 120 minutes in an air atmosphere. The end cap 24 is heated to remove binder material and cause the annular portion to shrink so that it will fit into open end 16. Such heating is at 1325° C. for 120 minutes.

After this, the end cap 24 is inserted into open end 16 to form a pre-assembly that is then fired at 1325° C. for 120 minutes in an air atmosphere to form the completed assembly. This firing shrinks the open end 16 and seals the unit together.

The assembly can be fired either horizontally or vertically for the final sintering operation, which occurs at temperatures above 1800° C. in a hydrogen-containing atmosphere. Preferably, the firing temperature is 1800° C. for 180 minutes and the atmosphere contains 100% hydrogen.

In a preferred embodiment, for example, for a 35 watt lamp, the sintered arc tube would have an overall length of 34.7 mm; the "open" end 16 an outside diameter of 6.8 mm; the closed end an outside diameter of 6.42 mm; a wall thickness for body 14 of 0.8 mm; a capillary tube diameter of 2.10 mm and an aperture diameter of 0.65 mm. The thickness of the annular portion 26 of end cap 24, and the wall thickness of the closed end 18, is 1.95 mm.

While there have been shown and described what are at present considered the preferred embodiments of the invention, it will be apparent to those skilled in the art that various changes and modifications can be made herein without departing from the scope of the invention as defined by the appended claims.

What is claimed is:

1. A method of making a ceramic arc tube for a metal halide lamp comprising the steps of:

forming as an integral unit a hollow body having one open end and a substantially closed end, said substantially closed end including an outwardly extending capillary tube;

forming an end cap for internal engagement with said open end, said end cap including an outwardly extending integral capillary tube;

pre-firing said end cap;

fitting said end cap into said open end to form a pre-assembly;

firing said pre-assembly to seal said end cap to said hollow body to form an assembly; and firing said assembly to sinter same.

2. The method of claim 1 wherein said hollow body has a first inside diameter and said end cap has a first outside diameter larger than said first inside diameter and said pre-firing of said end cap is for a time and at a temperature sufficient to shrink said outside diameter of said end cap to match or be smaller than said first inside diameter of said hollow body.

3. The method of claim 2 wherein said time is 120 minutes and said temperature is 1200° C.

4. The method of claim 1 wherein said hollow body is cylindrical and said open end has a diameter greater than the diameter of said closed end after assembly and final sintering.

5. The method of claim 4 wherein said open end diameter is from about 3 to 6% greater than said diameter of said closed end.

* * * * *